Feb. 7, 1933.     O. E. HARRIS     1,896,083
ICE CREAM DIPPER
Filed Oct. 16, 1931
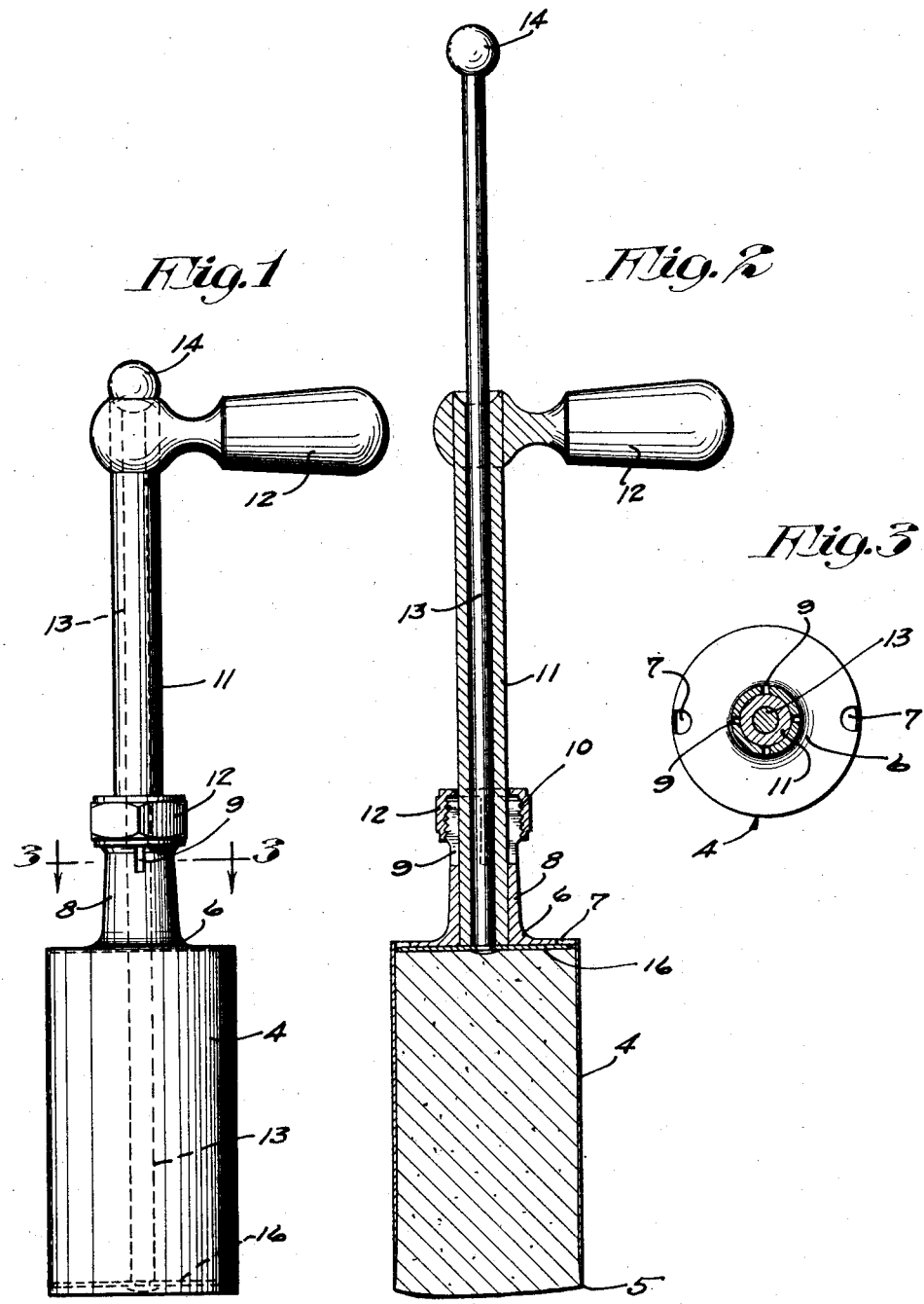
Inventor
Ora E. Harris
By his Attorneys
Merchant & ......

Patented Feb. 7, 1933

1,896,083

UNITED STATES PATENT OFFICE

ORA E. HARRIS, OF KEARNEY, NEBRASKA

ICE CREAM DIPPER

Application filed October 16, 1931. Serial No. 569,187.

My present invention provides an extremely simple and highly efficient device herein designated as an ice cream dipper in which cakes of ice cream are dipped or dug out of a solid body of ice cream such as contained in large cans, in giving suitable form, preferably cylindrical, for dipping into liquid chocolate for example by the use of a stick or paddle inserted into the form of ice cream cake. Of course, the device can be used more generally for removing and forming ice cream cakes, but it is especially designed to be used for the above indicated purpose.

In the accompanying drawing, which illustrates the invention, like characters indicate like parts throughout the several views.

Referring to the drawing:

Fig. 1 is a side elevation showing the complete device;

Fig. 2 shows the device in axial section, with some parts shown in full and with the cylinder or forming cup of the dipper filled with ice cream; and Fig. 3 is a section taken on the line 3—3 of Fig. 1.

The cylinder or forming cup 4 is provided with a sharp cutting edge 5 at one end and at its other end is provided with a head 6 and an air venting port 7 and an axially projected tubular neck 8, the outer end of which latter is diametrically split at 9 and provided with threads 10 at its split end.

A tubular stem 11 is inserted telescopically with a close fit into the neck 8 with its inner end flush with the inner face of the head 6. This sleeve is arranged to be detachably but rigidly and adjustably secured in the cylinder 4, by means of an annular nut 12 that works on the split threaded end of the neck 8 with the threads on the exterior end of the neck 8 and the interior of the nut 12 tapered so that the split end of the neck can be contracted tightly onto the stem 11 by tightening the nut. Obviously, the nut, when tightened, will securely hold the stem 11 fixed to the neck 8 and hence in respect to the cylinder 4. At its outer end the stem 11 is provided with a laterally projecting handle 12, by means of which the device may be gripped in the cylinder 4 and forced into the body of ice cream.

Working axially through the tubular stem 11 is an ejector rod 13, to the inner end of which is fixed a disc-like ejector head 16. The outer end of the rod 13 projects far beyond the outer end of the stem 11 and preferably terminates in a knob 14 that affords a suitable hand-piece. When the device is adjusted, as shown in Fig. 2, the ejector head 16 can be retracted against the head 8 and in that adjustment, when the cylinder 4 is forced into a body of ice cream, a cake of ice cream will be formed therein of maximum size, that is the full size of the complete cylinder. If a cake of small size is desired, say a three-quarter size, the stem 11 can be projected axially into the cylinder so that it will afford a stop to limit the retracting movement of the head 16. To force the formed cake of ice cream out of the cylinder or cylindrical forming cup, the rod 13 and head 16 will be forced toward the open end of said cylinder. Under retracting or backward movement of the head 16, air freely flows from the cylinder out through the ports 7.

When the ice cream cake is to be dipped in chocolate, a stick or wooden paddle will be forced into the cake, preferably axially thereof and preferably while the cake is still within the cylinder, which will hold the cake against splitting while the paddle is being inserted. The cake, anchored on the stick or paddle, will then be dipped in the liquid chocolate and coated therewith. In actual practice the efficiency of this device has been thoroughly demonstrated.

What I claim is:

1. An ice cream dipper comprising a cylindrical cup open at one end and provided at its other end with a head, a tubular stem secured to said head for axial adjustments therethrough and provided at its outer end with a handle, an ejecting rod working axially through said tubular stem, and a disc-like ejector head secured to the inner end of said rod and working in said cylinder, the inner end of said stem serving as a stop to variably limit the inward movements of said head.

2. An ice cream dipper comprising a cylindrical cup open at one end and provided at its other end with a head having an axial projecting neck split and threaded at its outer end, a tubular stem telescoped through said neck, a nut having tapered threaded engagement with the threads on the split end of said neck for contracting the latter on the said stem, said stem having a handle at its outer end, an ejecting rod working axially through said stem, and a disc-like ejecting head secured to the inner end of said rod and working in said cylindrical cup.

In testimony whereof I affix my signature.

ORA E. HARRIS.